US012659773B2

(12) United States Patent
Ababri et al.

(10) Patent No.: US 12,659,773 B2
(45) Date of Patent: Jun. 16, 2026

(54) PASSIVE SPEED ESTIMATION FOR FIXED AND MOBILE DEVICES

(71) Applicant: VERIZON PATENT AND LICENSING INC., Basking Ridge, NJ (US)

(72) Inventors: Zainab Ababri, Dallas, TX (US); Ratul K. Guha, Warwick, PA (US); Abhitabh Kushwaha, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 360 days.

(21) Appl. No.: 18/450,069

(22) Filed: Aug. 15, 2023

(65) Prior Publication Data

US 2025/0063399 A1    Feb. 20, 2025

(51) Int. Cl.
*H04W 24/08* (2009.01)

(52) U.S. Cl.
CPC .................................. *H04W 24/08* (2013.01)

(58) Field of Classification Search
CPC ...... H04W 24/08; H04W 24/10; H04W 24/02
See application file for complete search history.

(56) References Cited

U.S. PATENT DOCUMENTS

| | | | |
|---|---|---|---|
| 2019/0129395 A1* | 5/2019 | Niemiec | ............ G05B 23/0235 |
| 2020/0084087 A1* | 3/2020 | Sharma | ................. H04W 24/08 |
| 2020/0266955 A1* | 8/2020 | Agrawal | ............ H04W 72/542 |
| 2020/0342311 A1* | 10/2020 | Peroulas | .................. G06N 3/09 |
| 2020/0351169 A1* | 11/2020 | Papaloukopoulos | ... H04L 47/11 |
| 2020/0382361 A1* | 12/2020 | Chandrasekhar | .... G06N 3/0442 |
| 2021/0351973 A1* | 11/2021 | Ford | ..................... H04L 43/067 |

* cited by examiner

*Primary Examiner* — Dady Chery

(57) ABSTRACT

In some implementations, the techniques described herein relate to a method including: monitoring, by a processor, a network to extract data packets transferred over fixed time intervals; filtering, by the processor, the extracted data packets to identify data transfers exceeding a predefined size threshold; aggregating, by the processor, the identified data transfers; computing, by the processor, a network speed value based on the aggregated data transfers; and storing, by the processor, the computed network speed value in a data storage unit; and executing a network action based on a detected degradation in the computed network speed value.

17 Claims, 6 Drawing Sheets

PASSIVE SPEED ESTIMATION FOR FIXED AND MOBILE DEVICES

BACKGROUND

Performance of devices is critical to the optimal functioning of a network. One measurement, network speed, is central to this performance-slower speeds generally correlate with poor network performance. Indeed, speed is often the defining metric end users use to evaluate the performance of a network.

DETAILED DESCRIPTION

To measure the speed of UE, networks currently use active speed testing. In active speed testing, data is sent and received by a UE. For example, a UE may download and upload a large file. During the upload and download, the speed of the data transfer is measured, and the measured speed is used as the observed speed of the UE. Many systems schedule such active tests at regular intervals and monitor the overall speed of a network or individual speeds of UEs, or both.

While this approach measures the speed of a UE, it necessarily increases the overall congestion on the network which, paradoxically, itself impacts the observed speed. To remedy this issue, the example embodiments describe techniques for passive monitoring of speed using log data from base station devices (e.g., gNodeB or eNodeB devices) which eliminates additive congestion on the network for testing speed while providing more accurate measures of speed.

The techniques described herein provide a processor that monitors a network to pull out data packets that are transferred over fixed time slots. These extracted data packets are then filtered [by the processor?] to identify any data transfers that exceed a set size limit. The identified large data transfers are then collected together by the processor. From these large data transfers, a network speed value is computed. This computed network speed value is then stored in a data storage unit. If a drop in the computed network speed value is detected, a network action is initiated.

In some implementations, monitoring of the network involves reading several log files that have been recorded by a base station. In some implementations, filtering of the extracted data packets to find those that exceed a set size limit involves filtering these data packets based on one or more of the following: their volume, their time, their round trip time, or their ramp-up time. In some implementations, the calculation of the network speed value involves picking the highest speed value in the aggregated data transfers.

In some implementations, the method involves performing an action based on the identified network speed value, such as changing a configuration in a base station. This change could include one of the following: a change in power, a change in tilt, a change in spectrum, a change in transport, or a change in a Quality of Service (QoS) parameter. In some implementations, the QoS parameter could be one of the following: a QoS Class Identifier (QCI), Allocation and Retention Priority (ARP), Guaranteed Bit Rate (GBR), Maximum Bit Rate (MBR), Access Point Name-Aggregate Maximum Bit Rate (APN-AMBR), or User Equipment-Aggregate Maximum Bit Rate (UE-AMBR).

In some implementations, computer-readable media and devices for performing the aforementioned methods are also disclosed.

Figure 1:
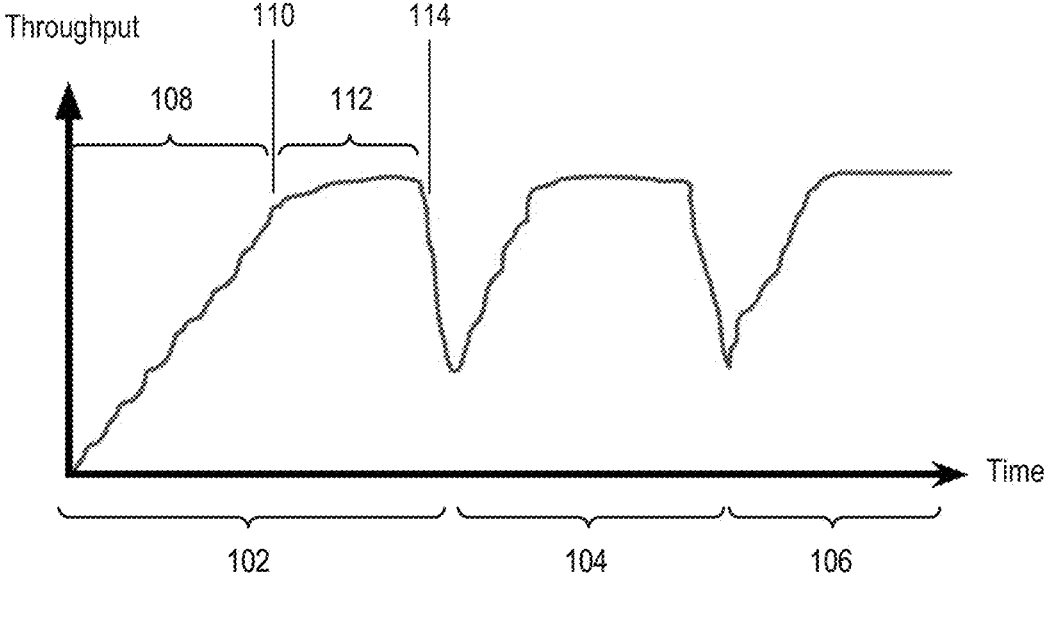
FIG. 1 is a diagram illustrating user equipment (UE) throughput over time according to some of the example embodiments.

FIG. 1 is a diagram illustrating UE throughput over time according to some of the example embodiments.

As depicted in graph 100, the throughput (e.g., the amount of data that the UE can transmit over a network in a given period) exhibits a cyclical pattern. This pattern is formed by repeating segments such as segment 102, segment 104, and segment 106. The cyclical nature of the throughput arises due to the use of a congestion control mechanism, which is designed to optimize network performance and prevent congestion collapse.

The cycle begins with a slow start period 108. During slow start period 108, the UE incrementally expands the size of the congestion window, which represents the maximum amount of data that can be in transit at any given time. The UE continues to expand the congestion window until either packet loss is detected, or a predefined slow start threshold is reached. This turning point is represented as point 110 on the graph.

Following the detection of packet loss or reaching the slow start threshold at point 110, the UE starts employing a congestion avoidance algorithm during period 112. In this phase, the UE maintains the highest permissible throughput as defined by the congestion avoidance algorithm. During this period 112, as will be discussed, the example embodiments extract and/or analyze log data for passive speed monitoring. For instance, analysis of the UE's log data during this period can help identify data transfers of an appropriate size for use in speed estimation. Further detail on this operation is described throughout the remainder of the disclosure and are not repeated herein.

Ultimately, at point 114, the UE decreases the congestion window back to its original size, marking the beginning of a new slow start period in segment 104. In some implementations, the UE can monitor the retransmission timeout (RTO) to determine the optimal timing for this reduction in the congestion window size. Monitoring the RTO serves as an early indicator of potential network congestion, prompting a preemptive reduction in the congestion window to alleviate the situation and ensure smooth data transmission.

This cyclical process, involving alternation between slow start and congestion avoidance, allows for dynamic adaptation to the network conditions, optimizing both UE's throughput and the overall network performance.

Figure 2:
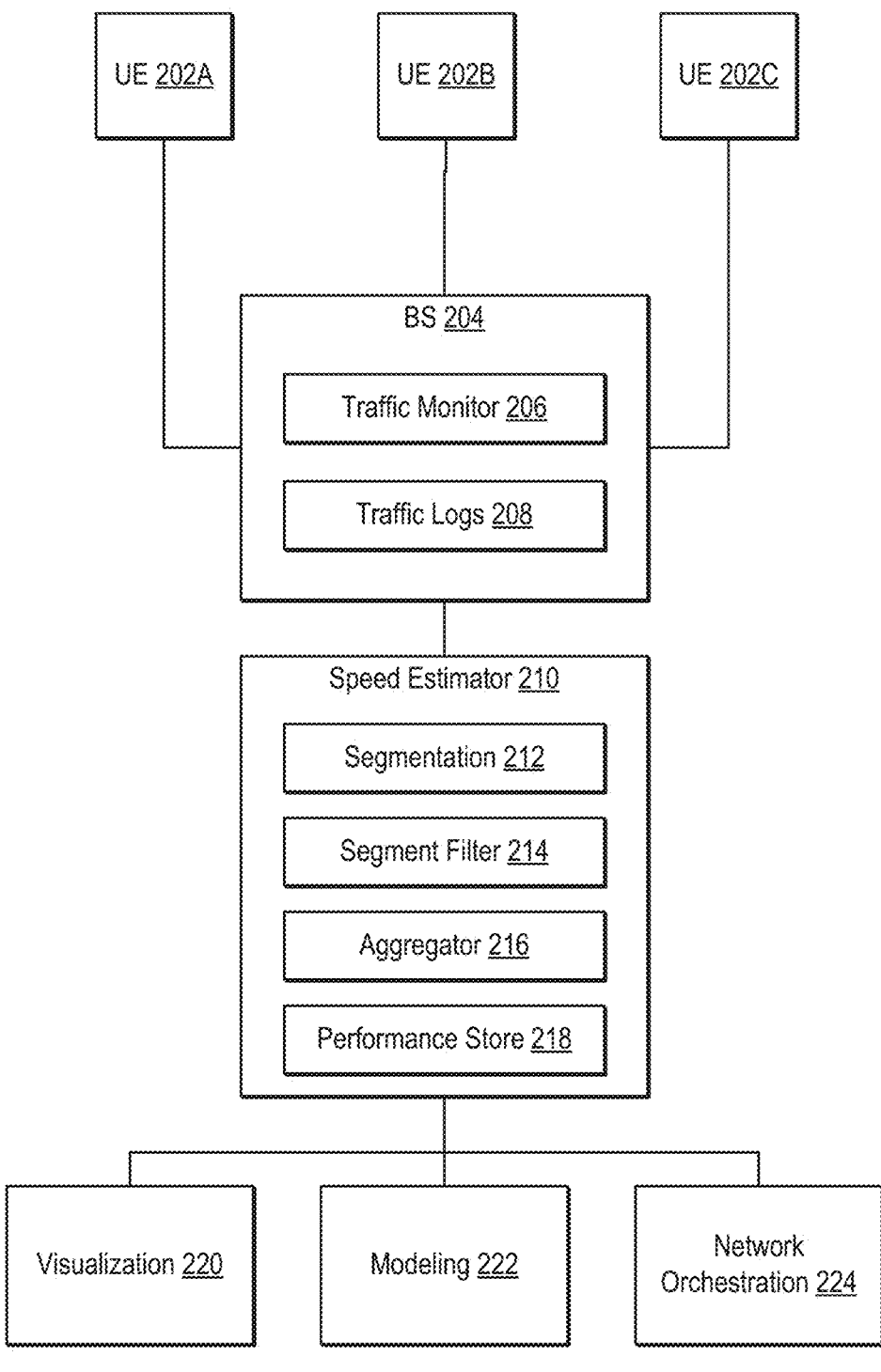
FIG. 2 is a block diagram illustrating a system for passively monitoring the speed of a network according to some embodiments.

FIG. 2 is a block diagram illustrating a system for passively monitoring the speed of a network according to some embodiments.

In the illustrated system, one or more UEs (e.g., UE 202A, UE 202B, UE 202C) are communicatively coupled to a base station (BS 204). BS 204 can include, among other components, a traffic monitor 206 for monitoring data transfers of the UEs and a traffic log data store 208 for storing traffic logs of those data transfers.

In an implementation, traffic monitor 206 monitors data transfers of the UEs. It continuously observes the network to log data packets, which are transferred over fixed time intervals. Traffic monitor can write log files to traffic log data store 208. The logs in traffic log data store 208 may include data such as the volume of data transferred for a given transfer, the time taken, the round trip time, the ramp-up time, etc.

The system further includes a speed estimator 210 communicatively coupled to BS 204 which is configured to periodically poll the logs stored in traffic log data store 208. Speed estimator 210 includes a segmentation stage 212 for segmenting traffic logs into segments, a segment filter 214 for filtering a given segment, aggregator 216 for aggregating traffic within a segment and computing a network speed, and a performance store 218 for storing current and historical network speeds.

Speed estimator 210 is configured to periodically poll the logs stored in the traffic log data store 208, thus continuously pulling in fresh data for analysis. Segmentation stage 212 segments the traffic logs into separate segments. Each segment represents a specific timeframe, allowing the system to analyze network traffic and performance at different periods (e.g., two minutes). The segmentation stage 212 sorts the log data into these segments using a predefined time interval, facilitating a granular analysis of the network traffic.

Segment filter 214 employs predetermined criteria to identify significant data transfers from the segmented traffic logs. Criteria can include factors such as the volume, time, round trip time, or ramp-up time of the data packets. This filtering ensures that the system focuses only on substantial data transfers that can potentially affect the overall network speed.

Following the filtering stage is the aggregator 216, which aggregates the traffic data within each segment. The aggregator 216 not only accumulates the data but also computes a network speed value for each segment. This computation is often based on the total volume of data transferred during the time window represented by the segment, effectively generating a network speed value for that period.

Finally, the speed estimator 210 includes a performance store 218. This store houses both current and historical network speed values computed by the aggregator. These network speed values serve as the primary resource for assessing the performance of the network over time. This performance store 218 offers a reliable repository of network performance data that various components of the system can access for their specific purposes.

Figure 3:
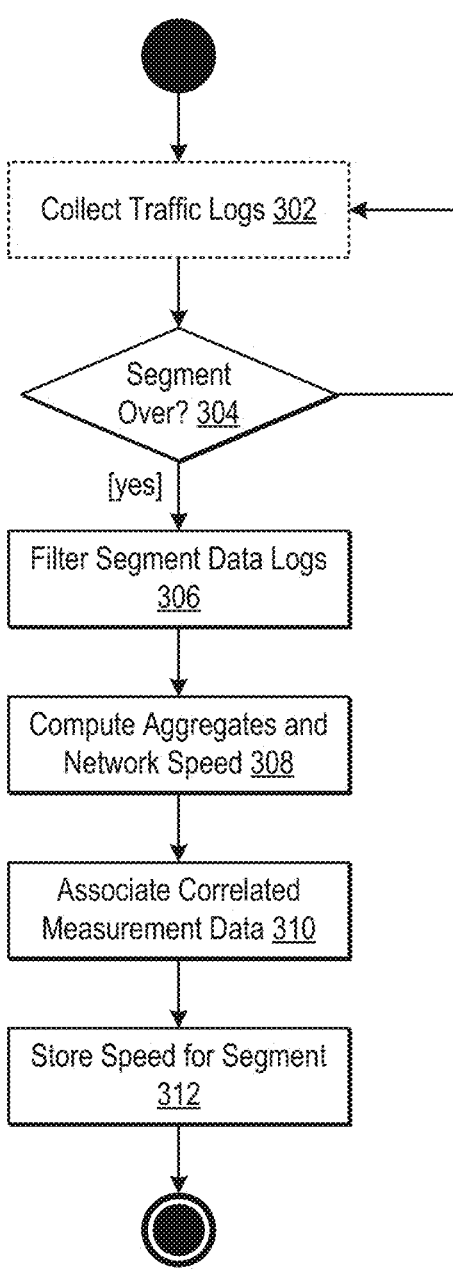
FIG. 3 is a flow diagram illustrating a method for passively monitoring the speed of a network according to some embodiments.

Specific functional details of speed estimator 210 are described more fully in the description of FIG. 3 which is not repeated herein.

Various components can access the network speeds stored in performance store 218. For example, a visualization component 220 can access the speeds and provide visualizations of the network's speed. A modeling component 222 can access the network speed data and train predictive models. A network orchestration component 224 can use the network speeds to perform network actions on a cellular network.

Visualization component 220 leverages network speed values to create visual representations of the network's performance. By illustrating the network speed data graphically, the visualization component 220 provides an intuitive interface for users or other network monitoring systems, making it easier to interpret the performance data. The visualizations can present network speeds over time, highlight periods of significant speed changes, or compare the current network speed to historical averages, among other useful representations.

Modeling component 222 also accesses the network speed data stored in the performance store 218 and use this data to train predictive models that forecast network speed and/or correction actions under various conditions. By analyzing patterns in historical network speeds and the factors that affect them, these predictive models can predict future network performance, helping network operators proactively manage network resources and plan necessary adjustments.

Network orchestration component 224 uses the network speed values to execute network actions on a cellular network. This component monitors the network speed and, upon detecting a degradation, triggers an appropriate network action to mitigate the issue. The network actions can include changes in base station configurations such as power, tilt, spectrum, or transport changes, or adjustments in Quality of Service (QoS) parameters. The orchestration component thus provides a proactive response mechanism to maintain optimal network performance based on the real-time and historical network speed data. Details of network orchestration component 224 are provided in FIG. 4, the description of which is not repeated herein.

FIG. 3 is a flow diagram illustrating a method for passively monitoring the speed of a network according to some embodiments.

In step 302, the method can include collecting traffic logs.

In some implementations, these traffic logs can comprise data collected at a base station. In some implementations, the base station can comprise an eNodeB or gNodeB base station. In some implementations, traffic logs could be harvested not only from eNodeB or gNodeB base stations, but also from an array of network components including, but not limited to, traffic shapers, routers, switches, or any other network devices positioned to monitor and log data packets between the UE and the endpoint.

In some implementations, the traffic logs can include records of data transfers between a UE and an endpoint. In some implementations, the traffic logs can include a UE identifier as well as traffic data such as a volume of a transfer (e.g., in megabytes, MB), the time of the transfer (in seconds), the round trip time (RTT) of the transfer (in seconds), the ramp-up period (e.g., in seconds), among other metrics.

In yet another embodiment, the traffic logs could provide more precise timestamps associated with each data transfer. This enhanced precision could enable accurate calculation of RTTs and transfer durations. Additionally, the traffic logs could contain information related to packet retransmissions or packet losses during the data transfer process. This information, which is integral to the functioning of TCP congestion control algorithms, could be valuable in further elucidating the network speed characteristics of the UE. Furthermore, the ramp-up period might be captured in more detail in the traffic logs. This could include a breakdown of the period into increments corresponding to the growth of the congestion window size. Such granularity could offer a more detailed view of the slow-start phase and help pinpoint the transition into the congestion avoidance phase. In some embodiments, each record within the traffic log might also be tagged with the data protocol type (e.g., TCP, QUIC, etc.) used for the transfer. This protocol information could enable differentiation between distinct data flows and facilitate protocol-specific analysis during subsequent stages of the process.

In step 304, the method can include determining if a segment is over.

In some implementations, a segment refers to a pre-defined period of time (e.g., a two-minute interval). The specific duration of this interval may be chosen based on a balance between the desire for granularity in the speed monitoring and the computational and storage demands of the method. If the method is currently within a segment, the method continues to collect traffic logs in step 302. If, however, the segment has ended, the method proceeds to step 306. In some implementations, step 302 and step 304 may not be executed in real-time. That is, in some implementations, step 304 may be executed as part of a bulk process whereby each segment within a larger time period (e.g., one day) is incrementally processed.

In step 306, the method can include filtering the segment traffic logs.

In some implementations, filtering of traffic logs can focus on identifying data transfers of significant volume. This prioritization may be grounded in the assumption that larger transfers are more likely to fully engage the congestion control mechanisms of the UE and thus provide a more reliable indicator of network speed.

In some implementations, in this step the method can apply one or more filter conditions to the raw traffic logs to reduce the number of analyzed traffic logs. As discussed, the traffic logs include various data fields such as a volume of a flow (in MB), a time of the flow (in seconds), an RTT (in seconds), and a ramp-up period. In some implementations, the filter can only select those records having values meeting predefined filter criteria.

For example, one filtering criterion could specify a minimum data transfer volume. Only those traffic log entries reflecting transfers of this volume or larger would be retained for further analysis. The exact threshold could be defined based on system requirements and the specific goals of the speed monitoring. In another embodiment, the filter may also consider the data protocol type associated with each transfer. Larger data transfers using specific protocols, like TCP or QUIC, may be prioritized as these protocols are designed to handle larger volumes and are more likely to fully engage the UE's congestion control mechanisms. Additionally, the filtering process may also factor in the duration of the data transfer. In some embodiments, only those transfers that exceed a certain duration are included in the filtered traffic logs. This ensures that the transfer has sufficiently progressed into the congestion avoidance phase, which is typically more representative of the UE's network speed. Some of all of these filter criteria may be combined and applied to filter the traffic logs.

For example, QUIC traffic may only be selected if the volume is over five MB, the time is under 40 seconds, the RTT is under 50 seconds, and the ramp-up time is under five seconds. Similarly, TCP may only be selected if the volume is over three MB, the time is under 25 seconds, the RTT is under 50 seconds, and the ramp-up time is under five seconds. The specific values are not intended to be limiting. Table 1 below illustrates an example of TCP and QUIC filter criteria following this example:

TABLE 1

| Filter Criterion | QUIC Transfer | TCP Transfer |
| --- | --- | --- |
| Volume (MB) | 5 | 3 |
| Time (s) | 40 | 25 |
| RTT (s) | 50 | 50 |
| Ramp-up (s) | 5 | 5 |

In step 308, the method can include computing aggregates and then a network speed based on the filtered traffic logs. In some implementations, the aggregation can comprise a maximum, minimum, or average speed. In some implementations, the aggregates can be computed on a per-UE basis. In other implementations, the aggregates can be computed across multiple UEs. In some implementations, computing aggregates across UEs can comprise computing aggregates globally while in other embodiments peer groups can be used to compute an aggregate across similarly situated UEs. One example of a peer groups is a geographical peer group (e.g., all UEs in a similar geographic region such as a base station coverage area). In some implementations, the aggregates can represent the speed of a UE (or multiple UEs). Details of computing an aggregate speed are provided in FIG. 5.

In some implementations, step 308 can include aggregating a volume of a number of time slots and then computing a speed based on the volume and the number and size of the time slots. Details of this process are provided in FIG. 5.

In step 310, the method can include associating the correlated data with measurement data. In some implementations, the base stations can collect measurement data of the UEs in addition to the traffic data. For example, the base station can collect, Reference Signal Receive Power (RSRP), Reference Signal Received Quality (RSRQ), and signal-to-noise ratio (SNR) measurements of the UEs along with traffic logs. Additionally, in some implementations, the method can include computing the UE distance to a base station using these metrics. In some implementations, these measurement data points are correlated in time with the traffic logs. In some implementations, the method can include similarly computing aggregates of these data points on a per-UE basis or across UEs. In some implementations, the method can then associate these measurements with the aggregate speed. In some implementations, these correlations can aid in understanding of the speed measurements as well as performing network action (described in FIG. 4).

In step 312, the method can include storing the aggregate speed data and any correlations for the segment in a persistent storage device.

In some implementations, the storage may involve writing the aggregated speed data and associated correlations to a database, which could be either locally or cloud hosted. The structure of this database might be designed to facilitate efficient querying and analysis of the stored data. Each entry could be time-stamped and associated with the specific segment to allow for chronological retrieval and trend analysis over time.

Moreover, in some embodiments, the storage process might include applying data compression or other optimization techniques to the aggregate speed data and correlations. This could help to maximize the storage efficiency and minimize the storage costs, particularly when dealing with large volumes of data over extended periods of time.

Finally, the storage process might also involve creating redundant copies of the data in different physical locations, for the purposes of data backup and disaster recovery. This would help ensure the availability and integrity of the stored data, protecting it against potential data loss events.

In some implementations, the data stored in step 312 can provided to downstream processes for further analysis. For example, a speed dashboard can display the current (and historical network speeds) to a user (e.g., a network operator or a user of UE). In some implementations, the data stored in step 312 can also be used for training machine learning (ML) models. For example, the speed for a given segment can be used as a training label and the measurement data (RSRP, RSRQ, SNR, etc.) can be used as input signals such that a supervised model (e.g., neural network) can be trained to predict a speed given the signal data. Further, as will be discussed next, speed data can be used to perform network automation within the network itself. Also, as will be discussed, the continuous passive monitoring capabilities provided in the method allow for the continuous checking of whether a network automation was successful by determining if the speed improved.

Figure 4:
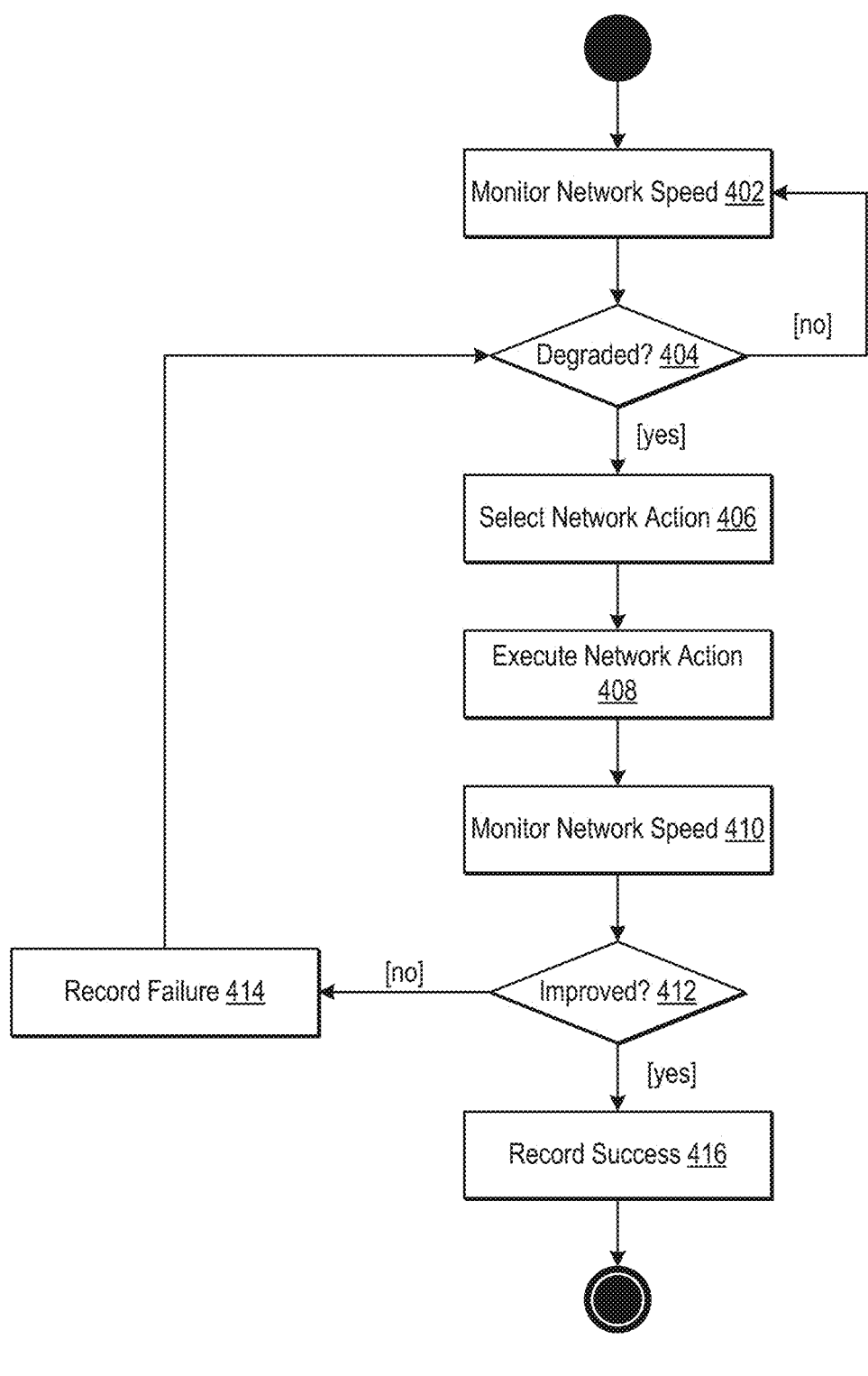
FIG. 4 is a flow diagram illustrating a method for performing a network action based on passively monitoring the speed of a network according to some embodiments.

FIG. 4 is a flow diagram illustrating a method for performing a network action based on passively monitoring the speed of a network according to some embodiments.

In step 402, the method can include monitoring a network speed. In some implementations, this step can be implemented using the methods of FIG. 3 which are not described in detail. In general, step 402 will continuously generate a network speed value at regular intervals.

In step 404, the method can include determining if the speed of the network has degraded for a given time step. If not, the method returns to step 402 and monitors the network speed. If, however, the network speed has degraded, the method proceeds to step 406.

Multiple methodologies can be used to identify whether the speed of the network has degraded within a specific time step. The process may entail the method performing a comparative analysis between the current network speed (generated in the current time step as determined by step 402) and a baseline network speed. The baseline network speed might be a fixed value, a historical average speed, or a speed derived from a previous time step. In some cases, the baseline could also be dynamically determined using statistical methods or predictive modeling, ensuring the assessment of degradation remains accurate and relevant to real-world conditions.

Moreover, the determination of network speed degradation could be supplemented by threshold values. For instance, a degradation might be considered significant only if the speed falls below a certain percentage of the baseline speed. This percentage value can be configurable and may be set in accordance with the specific performance requirements of the network.

Furthermore, the network speed degradation determination could consider the variance of the network speed over time. If the network speed exhibits high volatility or substantial fluctuations within a short time, it might be an indication of network instability which can be considered as a form of degradation. This approach can be beneficial in identifying transient or intermittent network issues that might be overlooked if only the average network speed is considered.

In step 406, the method selects a network action based on the degraded speed. In some implementations, the method can select the network action based purely on the recorded speed. In other implementations, the method can also use correlated measurement data to select a network action. In some implementations, the method can utilize a next action predictive model to predict (based on the most recent speed or a window of recent speeds) which network action to select.

In some implementations, the method can use a rules-based engine, where each rule corresponds to a specific action in response to a certain kind of network degradation. This rules-based system could be manually configured by network operators or could be automatically adapted based on historical performance data. Alternatively, the method may use machine learning algorithms, e.g., reinforcement learning, that learn from past experiences and success rates of the actions to choose the best action under the current network conditions. This self-learning system would become more accurate and reliable over time as it accumulates more training data from the network. In some cases, the method could use a combination of both rule-based and machine learning-based systems. For instance, machine learning could be employed to refine the rules in the rules-based system or to decide when to override the rules under certain exceptional conditions.

In addition, the selection of the network action might also consider the severity of the network degradation, the specific nature of the degradation (such as high latency, packet loss, etc.), the affected portion of the network, and the current network load. This additional contextual information could be incorporated to ensure the selected action is both appropriate and proportional to the degradation of network speed.

The network action selection may also incorporate correlated measurement data such as RSRP and RSRQ. For instance, a degraded network speed accompanied by a low RSRP may indicate issues with signal strength, thus the method may select a network action aimed at power control such as increasing the transmission power of the base station. Similarly, a degraded network speed along with poor RSRQ might point towards issues of interference or congestion, in which case, the method could opt for actions like adjusting the base station tilt to optimize coverage or changing the handover threshold to better distribute the network load. Therefore, by considering these correlated measurements along with the network speed, the method is capable of making more informed and targeted decisions to counteract network degradation.

In some implementations, the network action can comprise a self-organizing network (SON) action such as changing the power of a base station, changing the tilt of a base station, or updating the handover threshold value. In the case of SON actions, changing the power of a base station can include adjusting the transmission power to either improve signal strength or reduce interference. Altering the tilt of a base station can involve adjusting the antenna angle to modify the coverage area, to alleviate congestion or cover an area of weak signal. Updating the handover threshold value can entail modifying the criteria for when a UE should switch its connection to a neighboring base station, which can improve load balancing across the network or optimize the user's connection quality.

As another example, the network action can comprise a parameter change such as changing the used spectrum of a base station or changing the transport of the base station. Changing the used spectrum of a base station can include altering the radio frequency band at which the base station operates, potentially to make better use of available spectrum resources or to mitigate interference. Changing the transport of the base station can include transitioning from a wired connection to a wireless one, or vice versa, to improve backhaul capacity. It could also entail choosing a different transport protocol to better cater to the demands of specific applications, such as transitioning to a protocol that better supports real-time data for voice or video applications.

As another example, the network action can include changing a core network setting such as quality-of-service (QoS) parameter such as the QoS Class Identifier (QCI), Allocation and Retention Priority (ARP), Guaranteed Bit Rate (GBR), Maximum Bit Rate (MBR), Access Point Name-Aggregate Maximum Bit Rate (APN-AMBR), or User Equipment-Aggregate Maximum Bit Rate (UE-AMBR). Changing a core network setting, specifically a QoS parameter, can involve reconfiguring a variety of network metrics to ensure a certain level of service. For example, adjusting the QCI can change the priority level, packet delay, and packet loss rate for a specific flow of data. Modifying the ARP can affect the allocation and retention of network resources in congested conditions. Changing the GBR, MBR, APN-AMBR, or UE-AMBR can alter the data rate available to a user or an application, affecting the performance and responsiveness of data-intensive applications such as streaming video or real-time gaming.

As another example, the network action can comprise a network change function such as suggesting a new base station site or allocating new spectrum. Enacting a network change function as a response to network speed degradation may involve adding a new base station site or allocating additional spectrum. For instance, deploying a new base station site, which can include installing physical equipment and configuring the new site's connectivity, could serve to reduce congestion in a high-traffic area and consequently enhance network speeds. Similarly, allocating new spectrum can involve assigning additional frequency bands for data transmission, which can provide more channels for simultaneous communication and thus improve the capacity and speed of the network.

In some implementations, multiple actions may be selected and the disclosure is not limited to selecting a single action. In some implementations, the decision to execute multiple actions could be based on the extent and type of degradation observed or on the predictions of the next action predictive model.

After selecting the network action, in step 408, the method executes the selected action(s). In some implementations, this step can include, for example, sending appropriate control signals or commands to the affected network equipment or infrastructure. For actions such as power or tilt adjustments in base stations, this could involve sending adjustment instructions to the station's control system. For changes to core network settings, it may involve updating specific network configuration files or database entries. The execution process might vary based on the nature of the action selected, the type of network infrastructure, or the network management protocols in place.

In step 410, the method monitors the network speed after executing the selected action(s). This can be done in the same manner as described in step 402 and FIG. 3 and those details are not repeated again. The updated speed value, post-action, serves as an indication of the effectiveness of the action taken, providing insights into the network's response to the applied changes.

In step 412, the method determines if the network speed as improved after executing the selected network actions. If there is no improvement, or further degradation in network speed, the method records a failure of the network action to improve the network speed in step 414. Further, the method may return to step 406 where another network action is selected. By contrast, if the network speed improves, the method records a success of the network action in step 416.

The recording of successes and failures can be used for several purposes. First, it allows network administrators to track the effectiveness of different network actions over time, which can improve long-term network management and planning. Second, these recorded failures and successes can be used as learning experiences to adapt the network action selection in the future, potentially avoiding unsuccessful network actions. Third, in some implementations, failures (step 414) or successes (step 416) can be used to generate training data for a machine learning model for next action prediction.

Figure 5:
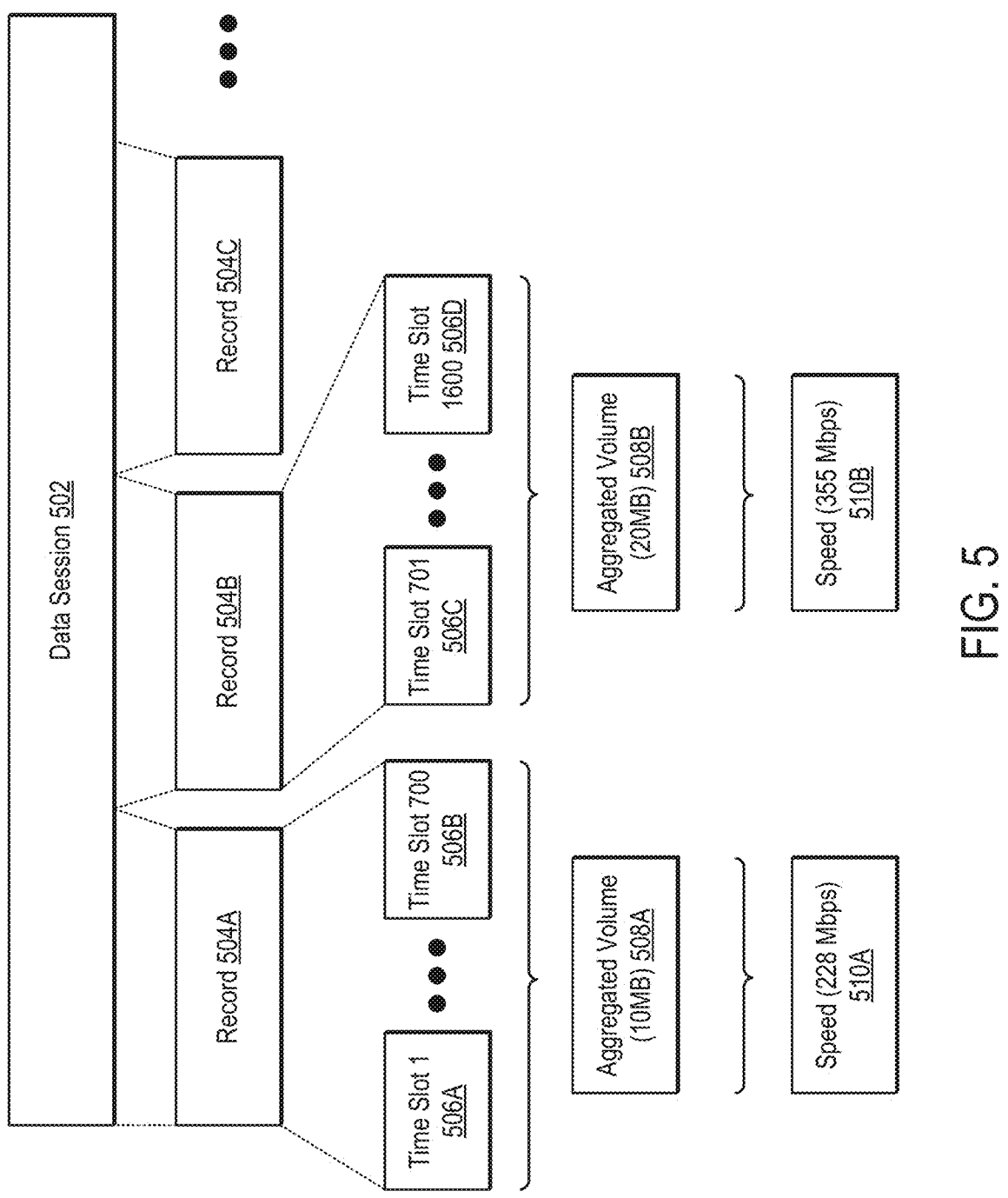
FIG. 5 is a block diagram illustrating captured data in a passive monitoring system according to some embodiments.

FIG. 5 is a block diagram illustrating captured data in a passive monitoring system according to some embodiments.

In the illustrated example, a data session 502 is illustrated. In some implementations, data session 502 may comprise a fixed length session of data transfers from one or more UEs. For example, data session 502 may comprise a ten minute period of data transfers recorded by a base station.

In some implementations, data session 502 may be represented by a number of records (e.g., record 504A, record 504B, record 504C, etc.). Each record may comprise a smaller, fixed-length set of time slots including data transferred by a base station. For example, each record may comprise a two minute-long set of time slots.

As illustrated, each record may include a plurality of time slots (time slot 506A, time slot 506B, time slot 506C, time slot 506D). A time slot may refer to a scheduling unit of a radio frame used by a cellular network. For example, each two minute record may include a fixed number of 0.5 ms time slots.

Using the foregoing methods, the time slots in FIG. 5 may be filtered (step 306) to remove those time slots not meeting volume or time constraints imposed by one or more filters. After removing the unqualified time slots, the method then aggregates (step 308) the time slots to obtain an aggregated data log. For example, time slot 506A through time slot 506B are filtered and aggregated to obtain an aggregated volume (508A) of 10 MB while time slot 506C through time slot 506D are filtered and aggregated to obtain an aggregated volume (508B) of 20 MB. Further, the network speed (speed 510A, speed 510B) can be computed using these volumes and the associated volumes. For example, speed 510A can be computed as $10^8/(700*0.5/1000)=228$ Mbps, assume 700 time slots of length 0.5 ms are present in record 504A.

Figure 6:
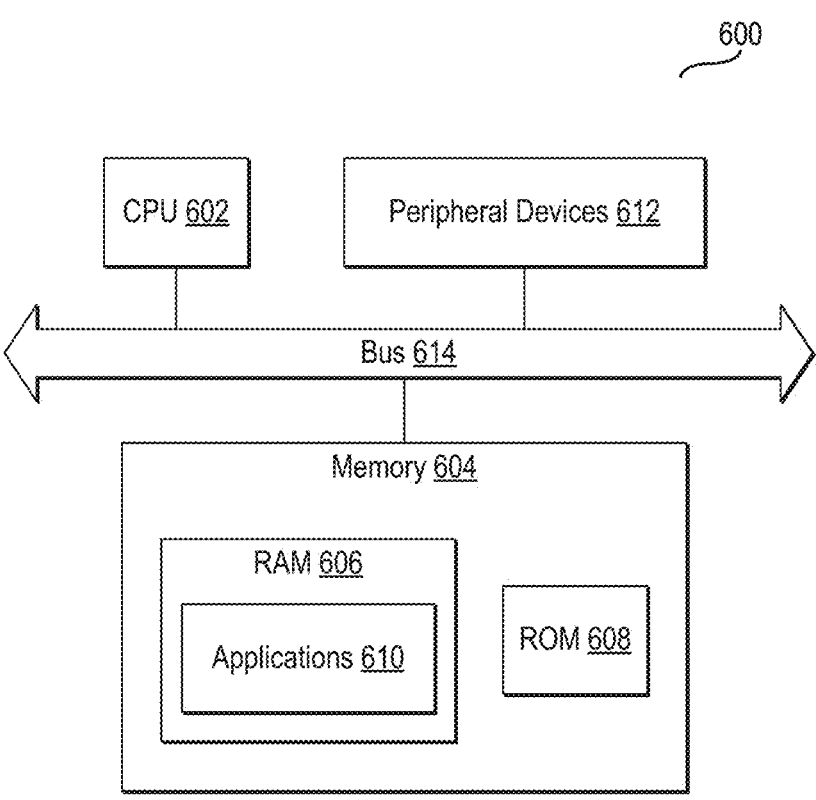
FIG. 6 is a block diagram of a computing device according to some embodiments of the disclosure.

FIG. 6 is a block diagram of a computing device according to some embodiments of the disclosure.

As illustrated, the device 600 includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a memory system including a dynamic random-access memory (DRAM), static random-access memory (SRAM), Flash (e.g., NAND Flash), or combinations thereof. In one embodiment, the bus 614 may comprise a Peripheral Component Interconnect Express (PCIe) bus. In some embodiments, the bus 614 may comprise multiple busses instead of a single bus.

Memory 604 illustrates an example of a non-transitory computer storage media for the storage of information such as computer-readable instructions, data structures, program modules, or other data. Memory 604 can store a basic input/output system (BIOS) in read-only memory (ROM), such as ROM 608 for controlling the low-level operation of the device. The memory can also store an operating system in random-access memory (RAM) for controlling the operation of the device.

Applications 610 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth®, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

monitoring, by a processor, a cellular network to extract data packets stored in logs of a cellular base station transferred over fixed time intervals;

filtering, by the processor, the extracted data packets to identify data transfers exceeding a predefined size threshold by applying a plurality of filter conditions to the extracted data packets, the plurality of filter conditions defining required properties of the extracted data packets;

aggregating, by the processor, the identified data transfers for at least one radio time slot;

computing, by the processor, a network speed value for the at least one radio time slot based on the aggregated data transfers;

extracting correlated data from the logs and associating the correlated data with the network speed value, the correlated data comprising one of Reference Signal Receive Power (RSRP), Reference Signal Received Quality (RSRQ), and signal-to-noise ratio (SNR) measurements; and executing a network action based on a detected degradation in the computed network speed value.

2. The method of claim 1, wherein the filter conditions comprise one or more of a volume, time, round trip time, or ramp-up time of each of the data packets.

3. The method of claim 1, wherein computing the network speed value comprises selecting a maximum speed value in the aggregated data transfers.

4. The method of claim 1, wherein the network action includes a change in a configuration of a base station, the change comprising one of a power change, a tilt change, a spectrum change, a transport change, or a change in a Quality of Service (QoS) parameter.

5. The method of claim 4, wherein the QoS parameter is one of a QoS Class Identifier (QCI), Allocation and Retention Priority (ARP), Guaranteed Bit Rate (GBR), Maximum Bit Rate (MBR), Access Point Name-Aggregate Maximum Bit Rate (APN-AMBR), or User Equipment-Aggregate Maximum Bit Rate (UE-AMBR).

6. The method of claim 1, wherein the network action comprises a network change function comprising one of adding a new base station site or allocating new spectrum.

7. A non-transitory computer-readable storage medium for tangibly storing computer program instructions capable of being executed by a computer processor, the computer program instructions defining steps of:

monitoring, by the computer processor, a cellular network to extract data packets stored in logs of a cellular base station transferred over fixed time intervals;

filtering, by the computer processor, the extracted data packets to identify data transfers exceeding a predefined size threshold by applying a plurality of filter conditions to the extracted data packets, the plurality of filter conditions defining required properties of the extracted data packets;

aggregating, by the computer processor, the identified data transfers for at least one radio time slot;

computing, by the computer processor, a network speed value for the at least one radio time slot based on the aggregated data transfers;

extracting correlated data from the logs and associating the correlated data with the network speed value, the correlated data comprising one of Reference Signal Receive Power (RSRP), Reference Signal Received Quality (RSRQ), and signal-to-noise ratio (SNR) measurements; and executing a network action based on a detected degradation in the computed network speed value.

8. The non-transitory computer-readable storage medium of claim 7, wherein the filter conditions comprise one or more of a volume, time, round trip time, or ramp-up time of each of the data packets.

9. The non-transitory computer-readable storage medium of claim 7, wherein computing the network speed value comprises selecting a maximum speed value in the aggregated data transfers.

10. The non-transitory computer-readable storage medium of claim 7, wherein the network action includes a change in a configuration of a base station, the change comprising one of a power change, a tilt change, a spectrum change, a transport change, or a change in a Quality of Service (QoS) parameter.

11. The non-transitory computer-readable storage medium of claim 10, wherein the QoS parameter is one of a QoS Class Identifier (QCI), Allocation and Retention Priority (ARP), Guaranteed Bit Rate (GBR), Maximum Bit Rate (MBR), Access Point Name-Aggregate Maximum Bit Rate (APN-AMBR), or User Equipment-Aggregate Maximum Bit Rate (UE-AMBR).

12. The non-transitory computer-readable storage medium of claim 8, wherein the network action comprises a network change function comprising one of adding a new base station site or allocating new spectrum.

13. A device comprising:

a processor configured to:

monitor a cellular network to extract data packets stored in logs of a cellular base station transferred over fixed time intervals, filter the extracted data packets to identify data transfers exceeding a predefined size threshold by applying a plurality of filter conditions to the extracted data packets, the plurality of filter conditions defining required properties of the extracted data packets, aggregate the identified data transfers for at least one radio time slot, compute a network speed value for the at least one radio time slot based on the aggregated data transfers, extract correlated data from the logs and associate the correlated data with the network speed value, the correlated data comprising one of Reference Signal Receive Power (RSRP), Reference Signal Received Quality (RSRQ), and signal-to-noise ratio (SNR) measurements, and execute a network action based on a detected degradation in the computed network speed value.

14. The device of claim 13, wherein the filter conditions comprise one or more of a volume, time, round trip time, or ramp-up time of each of the data packets.

15. The device of claim 13, wherein the network action includes a change in a configuration of a base station, the change comprising one of a power change, a tilt change, a spectrum change, a transport change, or a change in a Quality of Service (QoS) parameter.

16. The device of claim 15, wherein the QoS parameter is one of a QoS Class Identifier (QCI), Allocation and Retention Priority (ARP), Guaranteed Bit Rate (GBR), Maximum Bit Rate (MBR), Access Point Name-Aggregate Maximum Bit Rate (APN-AMBR), or User Equipment-Aggregate Maximum Bit Rate (UE-AMBR).

17. The device of claim 13, wherein the network action comprises a network change function comprising one of adding a new base station site or allocating new spectrum.

* * * * *